United States Patent
Jung et al.

(10) Patent No.: US 7,749,328 B2
(45) Date of Patent: Jul. 6, 2010

(54) METHOD OF OPERATING A DISHWATER WITH A CENTRAL CONTROL UNIT

(75) Inventors: Clemens Jung, Bruecken (DE); Peter Schwarzweller, St. Wendel (DE); Konrad Petry, Mandelbachteil (DE); Reinhold Baltes, Roschberg (DE)

(73) Assignee: Whirlpool Corporation, Benton Harbor, MI (US)

( * ) Notice: Subject to any disclaimer, the term of this patent is extended or adjusted under 35 U.S.C. 154(b) by 1166 days.

(21) Appl. No.: 10/714,110

(22) Filed: Nov. 14, 2003

(65) Prior Publication Data

US 2004/0118435 A1 Jun. 24, 2004

(30) Foreign Application Priority Data

Nov. 14, 2002 (DE) .................... 102 53 017

(51) Int. Cl.
*B08B 7/04* (2006.01)
*B08B 9/20* (2006.01)
*A47L 15/46* (2006.01)
(52) U.S. Cl. ...................................... 134/18; 134/25.2
(58) Field of Classification Search ............ 134/18, 134/25.2, 113
See application file for complete search history.

(56) References Cited

U.S. PATENT DOCUMENTS

| 3,114,253 | A | * | 12/1963 | Morey et al. ............ 68/12.02 |
| 3,888,269 | A | * | 6/1975 | Bashark .................... 134/57 D |
| 5,560,060 | A | | 10/1996 | Dausch et al. |
| 5,586,567 | A | * | 12/1996 | Smith et al. ............... 134/57 D |
| 5,960,804 | A | | 10/1999 | Cooper et al. |
| 2004/0163679 | A1 | * | 8/2004 | Jung et al. ................ 134/25.2 |

FOREIGN PATENT DOCUMENTS

JP        7-59716      *   3/1995

\* cited by examiner

*Primary Examiner*—Michael Kornakov
*Assistant Examiner*—Stephen Ko
(74) *Attorney, Agent, or Firm*—John W. Morrison; McGarry Bair, P.C.

(57) ABSTRACT

The invention relates to a method of operating a dishwasher with a central control unit, by measuring the turbidity of the rinsing liquid and establishing the course of the program as a function of the turbidity of the rinsing liquid. In a pre-rinse operation, measurement values determined by a sensor system are derived from the soiling of the rinsing liquid and supplied to the control unit, which calculates therefrom associated parameters for the further course of the program and establishes the latter correspondingly.

9 Claims, 3 Drawing Sheets

METHOD OF OPERATING A DISHWATER WITH A CENTRAL CONTROL UNIT

BACKGROUND OF THE INVENTION

1. Field of the Invention

The invention relates to a method of operating a dishwasher with a central control unit, by measuring the turbidity of the rinsing liquid and establishing the course of the program as a function of the turbidity of the rinsing liquid.

2. Description of the Related Art

Dishwashers currently available on the market normally have a control unit—a program control device, with which a rinse program, which can be made up of the part program steps "Pre-rinse", "Clean", "Intermediate Rinse", "Rinse" and "Dry", can be operated. For this purpose a number of selection switching means are necessary in order to make it possible for the user to adjust the different rinse programs. This multitude of manually effectable choices does not rule out dishwasher operating errors.

Consequently, there has been no lack of attempts to create a dishwasher where it is unlikely for the user to make an error, thereby restricting the dishwasher's consumption of power and water to the smallest possible measurement.

Dishwashers have been created where the dishwasher is set in motion at the start of the program and the parameters to be set for the continuation of the rinse program are set as a function of at least one determined parameter, which is necessary to the continuation of the rinsing operation and is influenced by the same. At the same time, in accordance with a specific development of the method, the degree of soiling, i.e. the turbidity of the rinsing liquid, is measured and the rinse program is established as a function of this turbidity in order to guarantee a fully automatic course of the rinse program and consequently to avoid the operator of the dishwasher making an error.

It has been shown that no adequate cleaning can be achieved in this manner with optimized power and water consumption for the various types and quantities of soiling. The dishes can be soiled a lot or a little and it can be easy or difficult to remove this soiling from the dishes. Only fresh or dried-on or burnt-on soiling can be referred to. In addition, the dishwasher can be loaded in the two spray planes or only in one spray plane.

SUMMARY OF THE INVENTION

An object of the present invention is to create a method of operating a dishwasher of the aforementioned type, where the rinse program runs automatically with minimum power and water consumption, and consideration is given to the variable soiling of the dishes according to the degree of soiling and solubility, as well as to an arbitrary loading of the spray plane, and nevertheless an excellent cleaning and drying of the dishes is achieved.

DETAILED DESCRIPTION

Figure 1:
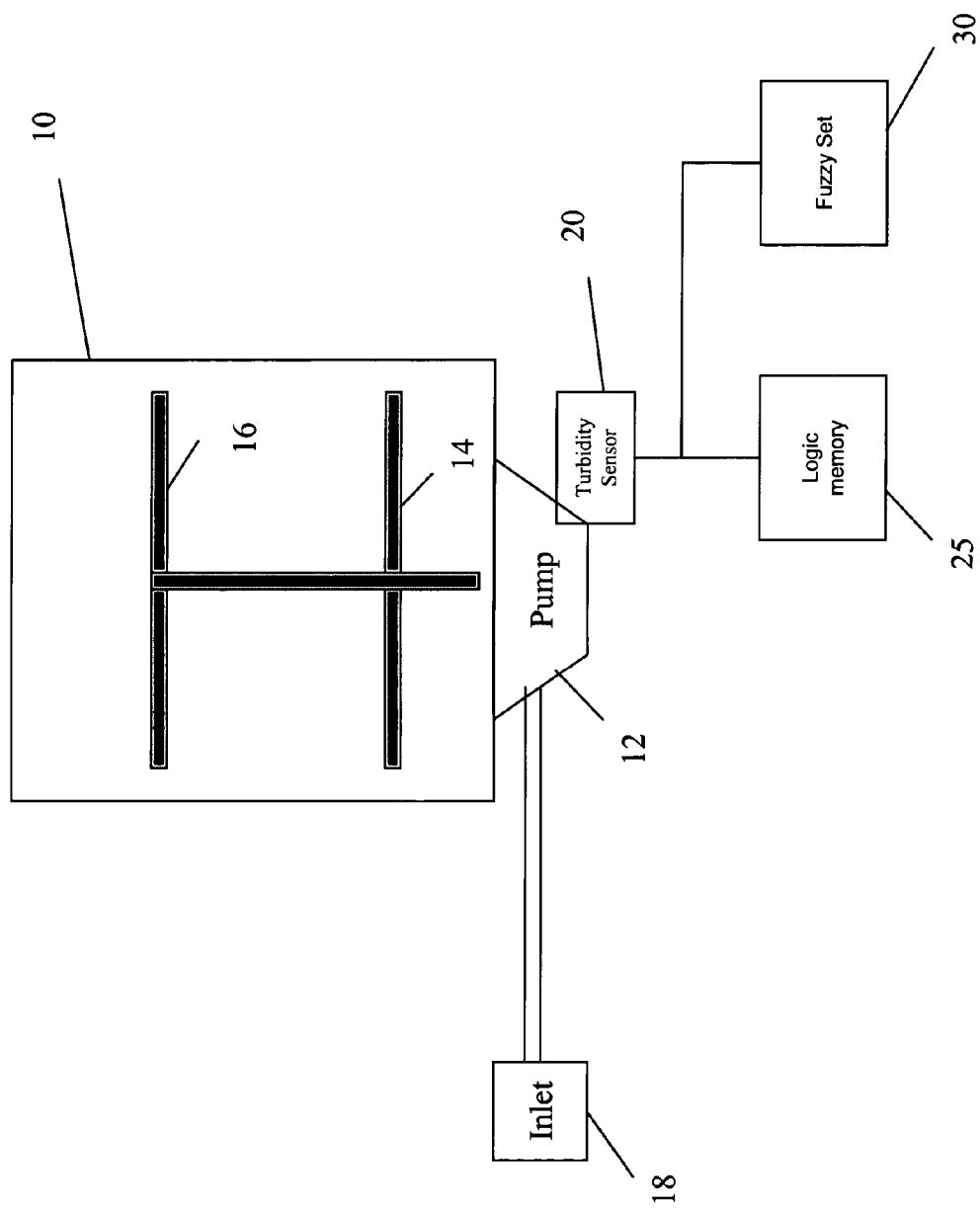
FIG. 1 is a schematic of a dishwasher in accordance with an exemplary embodiment of the present invention.

In FIG. 1 there is shown a dishwasher having a tub 10. A circulation pump 12 is provided for supplying liquid to a first spray arm 14 operating in an upper spray plane and a second spray arm 16 operating in a lower spray plane. The pump may supply liquid either simultaneously or separately to each spray arm in an alternating manner. A water drain shaft or inlet shaft 18 supplies liquid to the circulation pump 12 which has outputs connected to the upper and lower spray arms 14 and 16, respectively. A turbidity sensor 20 is incorporated into the inlet shaft 18 such that the turbidity of the inlet flow into the pump is measured. The dishwasher may also be in communication with programmable memory and logic 25 for controlling the wash and rinse programs of the dishwasher. Fuzzy logic or set 30 may also be incorporated to interlink input and output data and modify changes in the rinse program.

Figure 2:
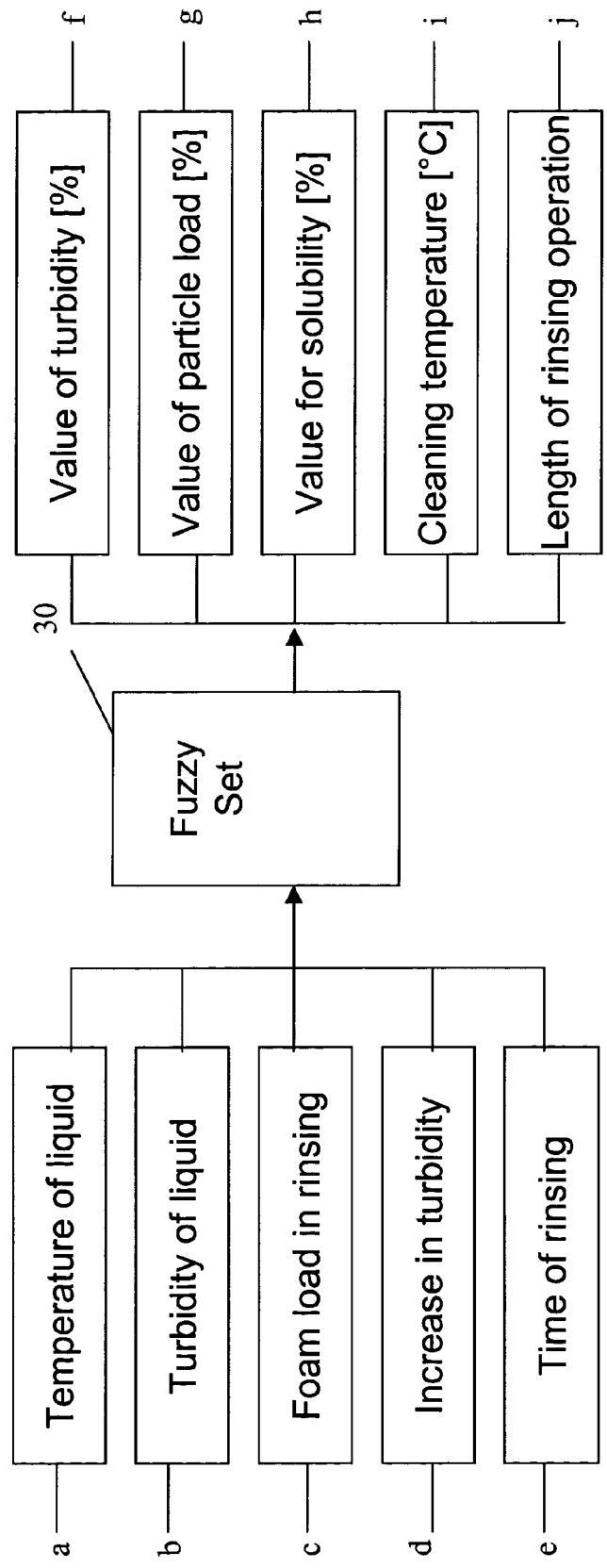
FIG. 2 illustrates a sensor data processing at a dishwasher central control unit.

As illustrated in FIG. 2, in a pre-rinse operation as transmitting the following input values from a sensor system to a control unit:
 a) the current temperature of the rinsing liquid and/or the inlet temperature of the fresh water,
 b) the turbidity of the rinsing liquid, separately with alternating operation of the lower spray plane and the upper spray plane or with common operation of the spray planes with a continuously operated spray system,
 c) the foam load in the rinsing liquid,
 d) the increase in the turbidity and
 e) the length of time of the rinsing operation until the increase in the turbidity has achieved the value of zero, The following output values could be derived from the input variables by the central control unit:
 f) a value of the turbidity of the rinsing liquid in %,
 g) a value of the particle load in the water in %,
 h) a value for the solubility of the soiling of the dishes in %,
 i) a value for the necessary cleaning temperature in ° C. and
 j) a value for the necessary length of the rinsing operation, and
 in that the further course of the program, with reference to the number and parameters of the part program steps, is established by the control unit as a function of these output values.

With this development of the method, the rinse program is fully adapted to the actual soiling of the dishes. The volumes of water, the length of rinse time and the rinsing temperatures are established on account of the measured and derived values for the soiling of the dishes and the soiling of the water, and the rinse program is accomplished automatically as a function thereof with reference to minimum power and water consumption and optimum cleaning and drying of the dishes and the necessary part program steps.

At the same time it can already be provided that the pre-rinse operation is effected with or without heating-up the rinsing liquid, it being possible to make the heating-up operation a function of the degree of soiling and the solubility of the soiling on the dishes.

Depending on the development of the dishwasher, with the spray arms of the lower and upper spray planes being operated in an alternating manner or in a simultaneous manner, clear criteria can be derived on the degree and the solubility of the soiling of the dishes, and in this way, the further course of the rinse program can be accomplished in an automatic manner with reference to the volume of water required, water temperature, length of cleaning operation, cleaning temperature, the necessary measurement of cleansing agent and heating-up of the water with the number of part program steps.

With the two spray planes of the dishwasher being operated in an alternating manner, another development provides that a turbidity difference value is derived from the turbidity values of the lower and upper spray plane and this turbidity difference value is compared to preset limit values by the control unit in order to make decisions for the continuation of the rinse program.

Figure 3:
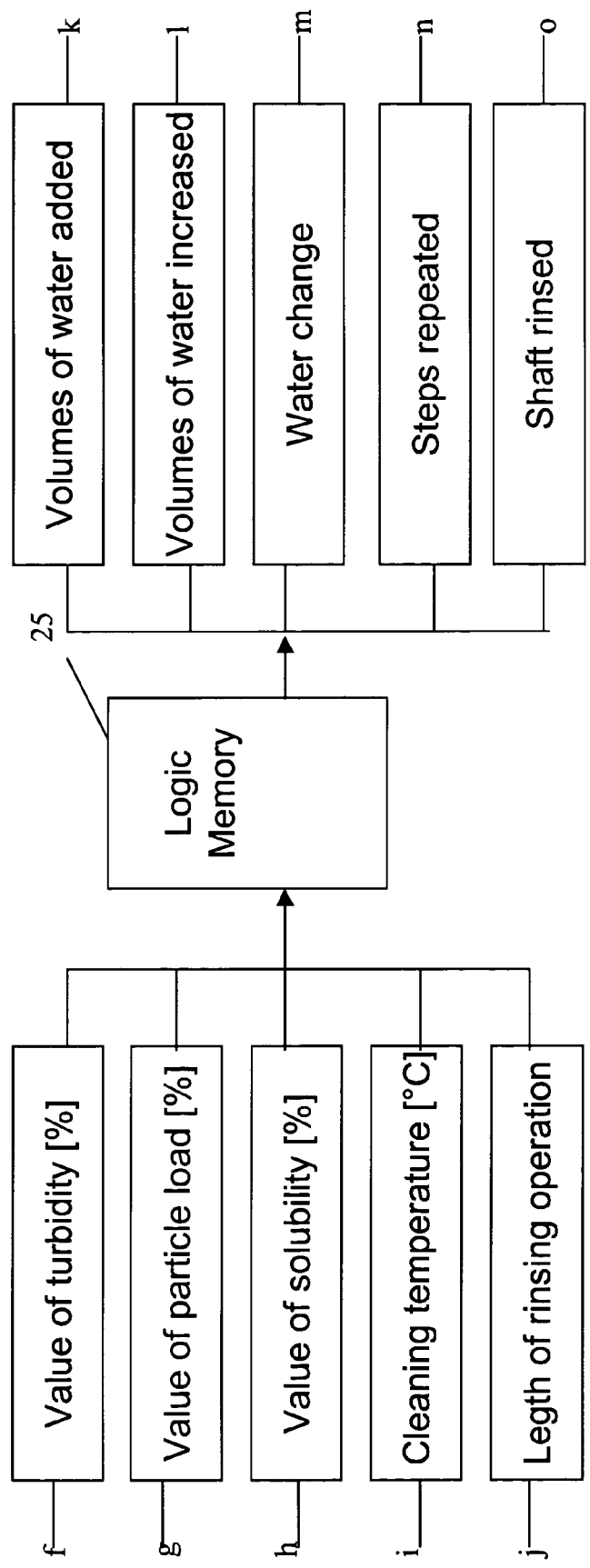
FIG. 3 illustrates further sensor data process at a dishwasher central control unit.

As shown in FIG. 3, consideration of the formation of foam in the rinsing liquid, generated in the rinse program, is achieved in that a measurement for the stability of the pressure of the circulating pump is derived from the measured values for the turbidity and the foam formation in the rinsing liquid, wherein, depending on the water output, k) small volumes of water are added,
l) the volume of water is increased up to a maximum value or
m) a complete water change is effected as well as
n) part program steps are repeated, and
o) the filter shaft or the drain shaft is rinsed before the next part program step.

The pressure of the circulating pump must remain constant for the clear development of the rinse program. This is provided for with the measures specified. The decisive factor of the new method is a reliable value for the solubility of the soiling of the dishes, which is deduced in that the value for the solubility of the soiling of the dishes is derived from the water temperature of the rinsing liquid and the length of time of the rinse operation until the increase in the turbidity of the rinsing liquid has reached the value zero, there being a low water temperature and a short rinse time with easy solubility and a high temperature and a long rinse time with difficult solubility, and in that these values are compared to preset limit values and, as a function therefrom, the necessary further part programs steps are established.

The necessary cleaning temperature and length of cleaning operation in the following part program steps can be derived from the turbidity of the rinsing liquid and the solubility of the soiling of the dishes. At the same time, it is provided, on the one hand, that the cleaning temperature for the rinsing liquid in the further part program steps is established as a function of the turbidity of the rinsing liquid and of the determined solubility of the soiling of the dishes, a low cleaning temperature for the rinsing liquid being selected for low turbidity and easy solubility and a high cleaning temperature for the rinsing liquid being selected for high turbidity and difficult solubility, and on the other hand, that a short cleaning operation is selected for low turbidity of the rinsing liquid and easy solubility of the soiling of the dishes and a long cleaning operation is selected for high turbidity of the rinsing liquid and difficult solubility of the soiling of the dishes.

In this case, the length of time of the cleaning operation and/or the cleaning temperature is (are) preferably continuously controlled between a minimum value and a maximum value as a function of the turbidity of the rinsing liquid and of the solubility of the soiling of the dishes.

The control costs in the central control unit can be kept down by using a fuzzy set in the central control unit for deriving the output values from the input values.

If, at the same time, it is also provided that the fuzzy rules, i.e. the logical interlinking of the individual linguistic terms, can be freely programmed in a freely programmable memory in order to adapt the fuzzy set to changes in the rinse program of the dishwasher, the course of the program can then be adapted easily to new conditions.

The course of the program can also be adapted by modifying the access conditions of the fuzzy inputs and/or the output conditions of the fuzzy outputs or of the linguistic terms of the fuzzy outputs.

We claim:

1. A method of cleaning dishes in a dishwasher in accordance with a programmed wash cycle implemented by a central control unit and comprising a rinse step where a rinse liquid is recirculated in the dishwasher and a cleaning step where a wash liquid is recirculated in the dishwasher, the method comprising:
   determining a solubility of soil on the dishes to be cleaned by determining at least one of a temperature of the rinse liquid, and a length of time for a turbidity of the rinse liquid to stop increasing during the rinse step by determining from a turbidity sensor a difference in turbidity measurements associated with a selective operation of an upper spray device and a lower spray device; and
   setting at least one operating parameter of the cleaning step based on the determined solubility.

2. The method according to claim 1, wherein the selective operation of the upper spray device and the lower spray device comprises alternately operating the upper spray device and the lower spray device.

3. The method according to claim 1, wherein the determination of solubility occurs during a pre-rinse step.

4. The method according to claim 3, wherein the pre-rinse step comprises one of heating or not heating the rinse liquid.

5. The method according to claim 3, wherein a fuzzy set is used in the central control unit for determining the solubility.

6. The method according to claim 5, wherein fuzzy rules are programmed in a programmable memory of the central control unit in order to adapt the fuzzy set to changes in the rinse step.

7. The method according to claim 3, wherein the pre-rinse step comprises a portion of the rinse step.

8. The method according to claim 1, wherein the setting of the at least one operation parameter comprises setting at least one of a duration of the cleaning step, a water temperature of the cleaning step, a volume of water during the cleaning step, and a quantity of cleaning agent.

9. The method according to claim 8, wherein the duration of the cleaning step and the water temperature of the cleaning step are continuously controlled between a minimum value and a maximum value as a function of the turbidity of the rinse liquid and the determined solubility.

* * * * *